United States Patent
Matsuta

(10) Patent No.: US 12,075,006 B2
(45) Date of Patent: Aug. 27, 2024

(54) INFORMATION PROCESSING APPARATUS, METHOD, AND NON-TRANSITORY RECORDING MEDIUM

(71) Applicant: Naoya Matsuta, Kanagawa (JP)

(72) Inventor: Naoya Matsuta, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 57 days.

(21) Appl. No.: 18/110,809

(22) Filed: Feb. 16, 2023

(65) Prior Publication Data
US 2023/0300259 A1 Sep. 21, 2023

(30) Foreign Application Priority Data

Mar. 17, 2022 (JP) ................. 2022-043092

(51) Int. Cl.
*G06F 15/177* (2006.01)
*G06F 9/00* (2018.01)
*H04N 1/00* (2006.01)

(52) U.S. Cl.
CPC . *H04N 1/00037* (2013.01); *H04N 2201/0036* (2013.01)

(58) Field of Classification Search
CPC ............... H04N 1/00037; H04N 2201/0036
See application file for complete search history.

(56) References Cited

U.S. PATENT DOCUMENTS

| | | | | |
|---|---|---|---|---|
| 9,313,355 | B2* | 4/2016 | Yamashita | H04N 1/00928 |
| 2012/0194836 | A1* | 8/2012 | Uchida | H04N 1/32587 |
| | | | | 358/1.13 |
| 2015/0339544 | A1* | 11/2015 | Tashiro | G06F 3/1204 |
| | | | | 358/1.15 |

FOREIGN PATENT DOCUMENTS

JP 2006-015603 1/2006

* cited by examiner

*Primary Examiner* — Xuxing Chen
(74) *Attorney, Agent, or Firm* — Duft & Bornsen, PC

(57) ABSTRACT

An information processing apparatus, a method, and a non-transitory recording medium. The information processing apparatus, in a case the controller completes an activation after the operation panel completes an activation, detects a connection error between the operation panel and the controller by performing a first determination process of determining whether activation of the controller is completed within a first predetermined period of time after activation of the operation panel is completed and by performing a second determination process of determining whether communication between the operation panel and the controller is established within a second predetermined period of time after completion of the activation of the controller, and in a case the controller completes the activation before the operation panel completes the activation, detects the connection error between the operation panel and the controller by performing the second determination process.

7 Claims, 6 Drawing Sheets

INFORMATION PROCESSING APPARATUS, METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2022-043092, filed on Mar. 17, 2022, in the Japan Patent Office, the entire disclosure of which is hereby incorporated by reference herein.

BACKGROUND

Technical Field

The present disclosure relates to an information processing apparatus, a method, and a non-transitory recording medium.

Background Art

Some image forming apparatuses display an error related to a controller.

For example, in a disclosed image forming apparatus, an operation panel detects an activation error of a controller for the purpose of allowing a user to determine cause of the activation error. The image forming apparatus may detect an error in a connection between the operation panel and the controller in a case the operation panel and the controller are activated separately. Note that the activation of the controller refers to, for example, activating a Basic Input Output System (BIOS) of the controller.

SUMMARY

Embodiments of the present disclosure describe an information processing apparatus, a method, and a non-transitory recording medium. The information processing apparatus, in a case the controller completes an activation after the operation panel completes an activation, detects a connection error between the operation panel and the controller by performing a first determination process of determining whether activation of the controller is completed within a first predetermined period of time after activation of the operation panel is completed and by performing a second determination process of determining whether communication between the operation panel and the controller is established within a second predetermined period of time after completion of the activation of the controller, and in a case the controller completes the activation before the operation panel completes the activation, detects the connection error between the operation panel and the controller by performing the second determination process.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
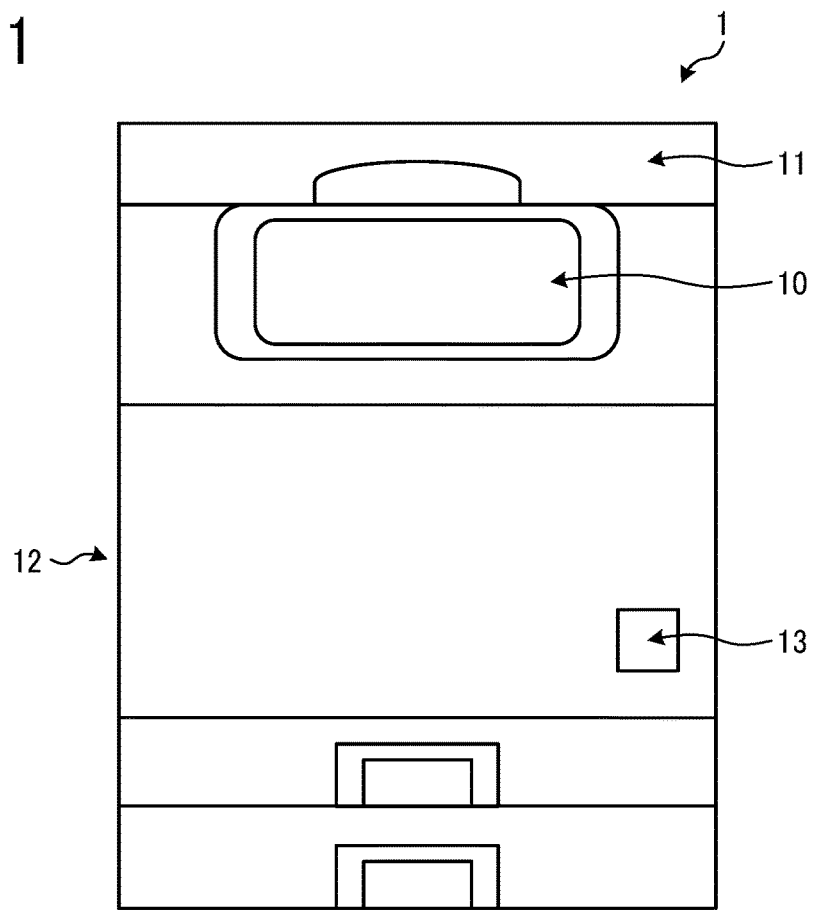
FIG. 1 is a schematic diagram illustrating an example of appearance of an image forming apparatus according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, embodiments of an image processing apparatus, a method, and a non-transitory recording medium are described in detail with reference to the accompanying drawings. The present disclosure, however, is not limited to the following embodiments, and the constituent elements of the following embodiments include elements that can be easily conceived by those skilled in the art, those being substantially the same ones, and those being within equivalent ranges. Furthermore, various omissions, substitutions, changes, and combinations of the constituent elements can be made without departing from the gist of the following embodiments.

Figure 2:
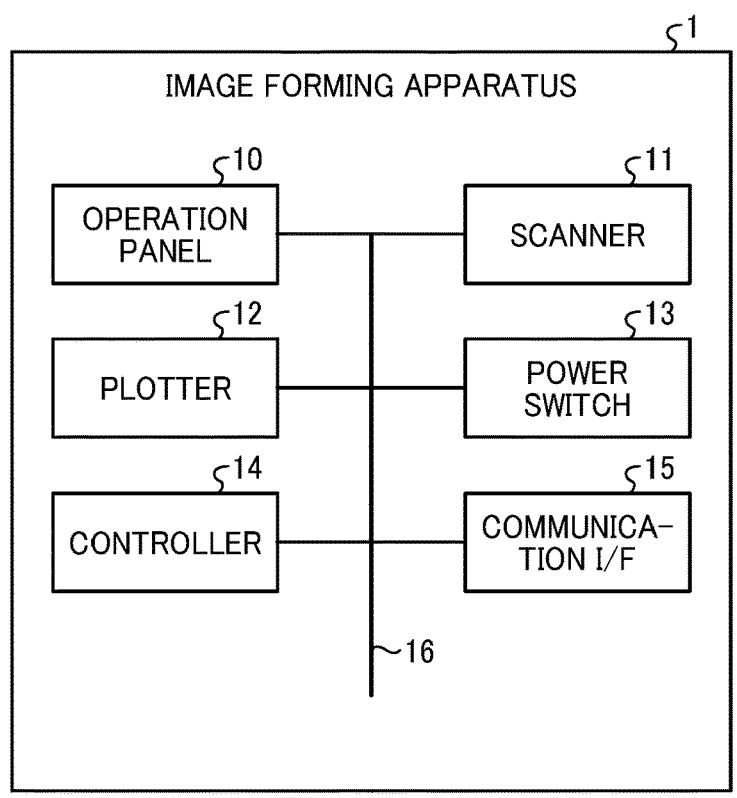
FIG. 2 is a block diagram illustrating a hardware configuration of the image forming apparatus according to the embodiments of the present disclosure.

FIG. 1 is a schematic diagram illustrating an example of appearance of an image forming apparatus 1 according to the present embodiment. FIG. 2 is a diagram illustrating an example of a hardware configuration of the image forming apparatus 1 according to the present embodiment. As illustrated in FIGS. 1 and 2, the image forming apparatus 1 according to the present embodiment includes an operation panel 10, a scanner 11, a plotter (printer) 12, a power switch 13, a controller 14, and a communication interface (I/F) 15 which are connected to each other through a system bus 16. In the present embodiment, in response to a detection of a connection error (activation error) related to the controller 14 after the power switch 13 is pressed by the user, the image forming apparatus 1 causes the operation panel 10 to display the detection of error. The image forming apparatus 1 is an example of an information processing apparatus.

The operation panel 10 receives various inputs according to user's operations and displays various information.

Figure 3:
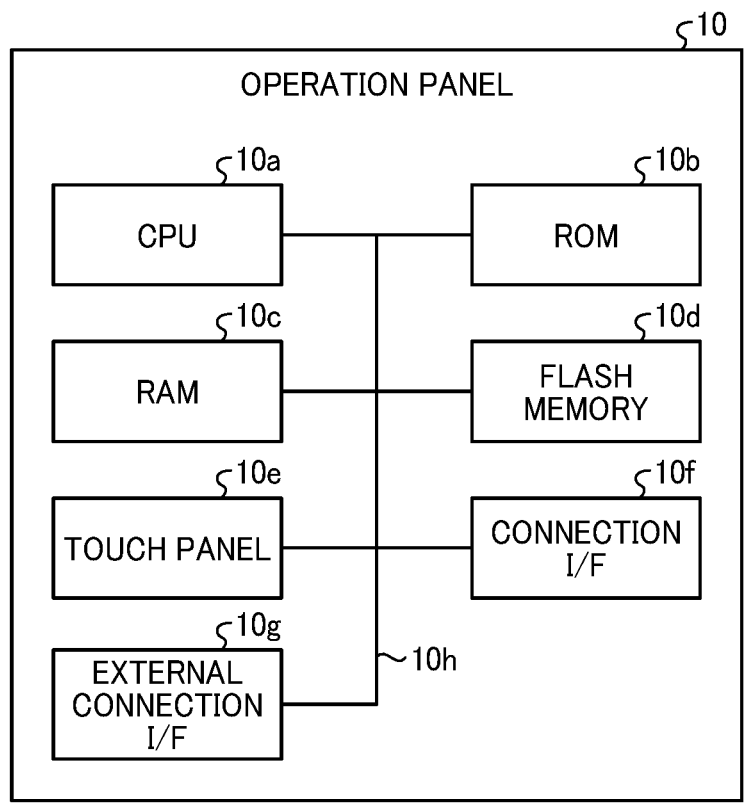
FIG. 3 is a block diagram illustrating an example of a hardware configuration of an operation panel according to the embodiments of the present disclosure.

FIG. 3 is a diagram illustrating an example of a hardware configuration of the operation panel 10 according to the present embodiment.

As illustrated in FIG. 3, the operation panel 10 includes a central processing unit (CPU) 10a, a read only memory (ROM) 10b, a random access memory (RAM) 10c, a flash memory 10d, a touch panel 10e, a connection I/F 10f, and an external connection I/F 10g, which are connected to each other through a system bus 10h.

The CPU 10a controls the operation of the entire operation panel 10. The CPU 10a uses the RAM 10c as a work area to execute a program stored in the ROM 10b or the flash memory 10d, to control the overall operation of the operation panel 10 and to implement various functions such as displaying information (images) according to input received from the user.

The operation panel 10 receives various input according to user's operations and displays various information. The touch panel 10e is implemented by a liquid crystal display (LCD) equipped with a touch panel function. However, the touch panel 10e is not limited to this configuration, and may be implemented by, for example, an organic electro luminescence (EL) display device equipped with the touch panel function.

The connection I/F 10f is an interface for communicating with the controller 14 through the system bus 16. More specifically, the connection I/F 10f communicates with a connection I/F 14e described below (see FIG. 4) of the controller 14 through the system bus 16. A dedicated communication path may be provided between the operation panel 10 and the controller 14. In this case, the connection I/F 10f may communicate with the controller 14 through the communication path. The communication path may comply with, for example, a Universal Serial Bus (USB) standard, but the communication path may be of any other wireless or wired standard.

The external connection I/F 10g is an interface for connecting with a storage medium. The storage medium is a non-volatile storage device. The storage medium is removable and portable with respect to the external connection I/F 10g. The storage medium includes, for example, a Secure Digital (SD) (registered trademark) memory card, USB memory, COMPACT FLASH (registered trademark), hard disk drive (HDD), solid state drive (SSD), and the like. Any storage medium may be used as long as the image forming apparatus 1 can write and read information.

Returning to the description of FIGS. 1 and 2, the scanner 11 scans and reads an image recorded on a medium such as paper. The scanner 11 then transmits image data obtained by scanning to the controller 14.

The plotter 12 prints an image based on the image data transmitted from the controller 14 on a sheet material such as paper, and outputs the sheet material on which the image is printed.

In the present embodiment, the image forming apparatus 1 includes, for example, a copy function, a scan function, and a print function by including the above-described scanner 11 and plotter 12. Note that the image forming apparatus 1 may include hardware for implementing a facsimile function. Further, the image forming apparatus 1 may be a multifunction peripheral including at least two functions out of the copy function, the print function, the scan function and the facsimile function.

The present disclosure is applicable to any image forming apparatus such as a copier, printer, scanner, facsimile, and the like.

The power switch 13 is a switch for supplying power to each unit of the image forming apparatus 1 and stopping the supply of power to each unit. In response to a pressing of the power switch 13 by the user, power is supplied to each unit of the image forming apparatus 1, and the image forming apparatus 1 becomes operable. Further, in response to the operation of the power switch 13 by the user to return to an original position before the power switch 13 is pressed, the power supply to each unit of the image forming apparatus 1 is stopped, and the operation of the image forming apparatus 1 is stopped.

The controller 14 performs overall control of the image forming apparatus 1. The controller 14 controls the overall operation of the image forming apparatus 1 and implements various functions such as the above-described copy function, scan function, facsimile function, and print function.

Figure 4:
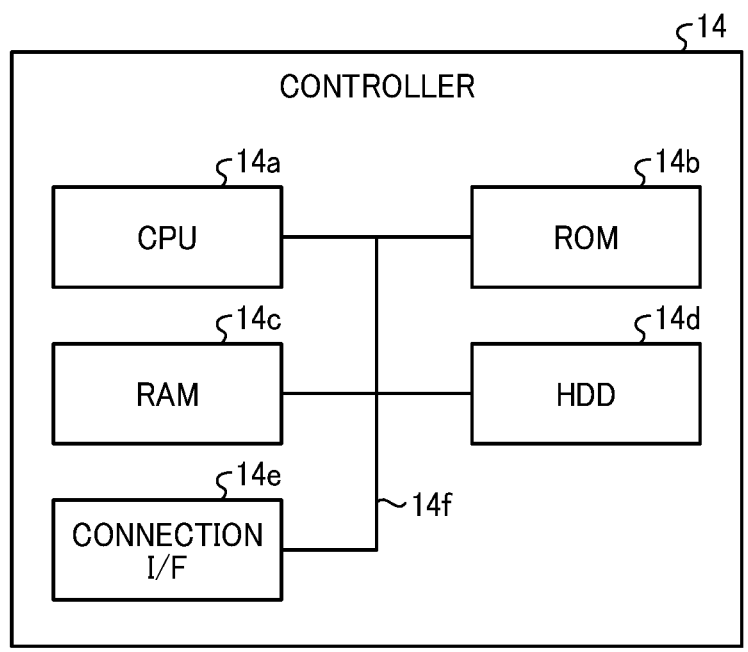
FIG. 4 is a block diagram illustrating an example of a hardware configuration of a controller according to the embodiments of the present disclosure.

FIG. 4 is a diagram illustrating an example of a hardware configuration of the controller 14 according to the present embodiment.

As illustrated in FIG. 4, the controller 14 includes a CPU 14a, a ROM 14b, a RAM 14c, an HDD 14d, and a connection I/F 14e, which are connected to each other by a system bus 14f.

The CPU 14a performs overall control of the operation of the controller 14. The CPU 14a controls the overall operation of the controller 14 by executing programs stored in the ROM 14b, the HDD 14d, or the like using the RAM 14c as a work area. For example, the CPU 14a generates image data to be printed by the plotter 12 and transmits the generated image data to the plotter 12. Further, the CPU 14a performs image processing on the image data transmitted from the scanner 11.

The connection I/F 14e is an interface for communicating with the operation panel 10 through the system bus 16. More specifically, the connection I/F 14e communicates with the connection I/F 10f (see FIG. 3) of the operation panel 10 through the system bus 16. Note that in a case the above-described dedicated communication path is provided between the operation panel 10 and the controller 14, the connection I/F 14e may communicate with the operation panel 10 through the communication path.

Figure 5:
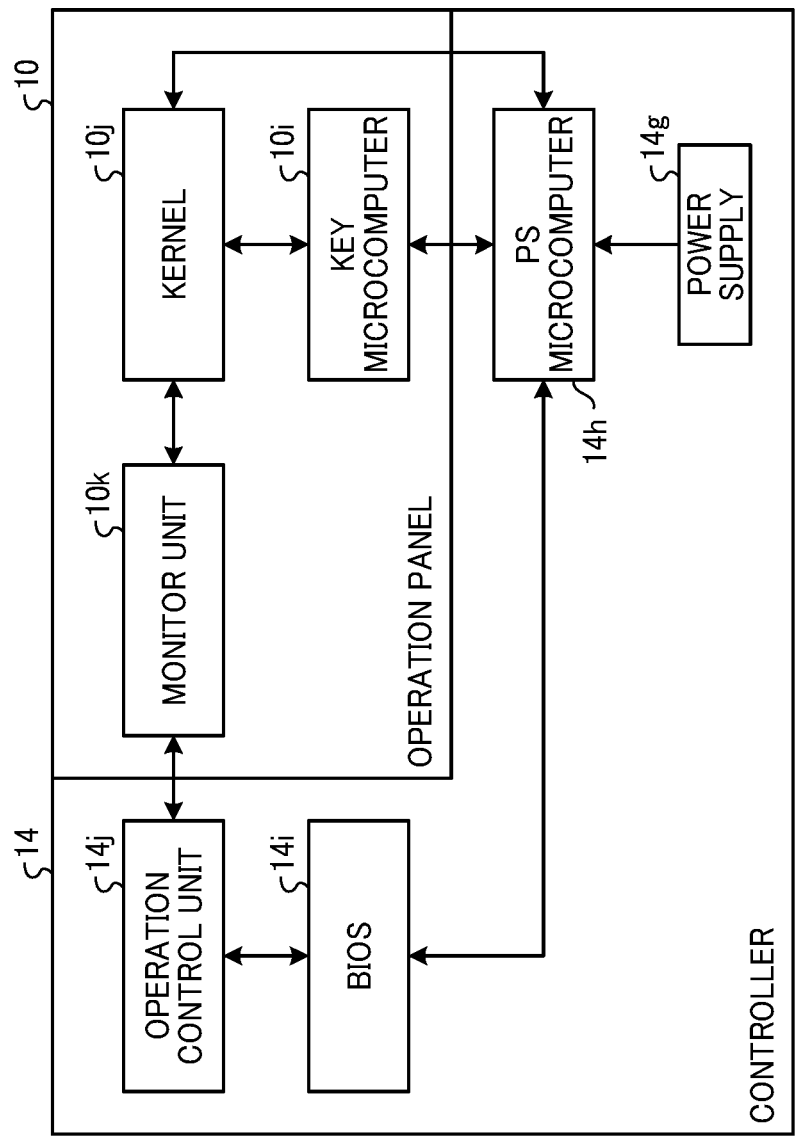
FIG. 5 is a block diagram illustrating an example of a functional configuration (module configuration) of the operation panel and the controller according to the embodiments of the present disclosure.

FIG. 5 is a block diagram illustrating an example of a functional configuration (module configuration) of the operation panel 10 and the controller 14 according to the present embodiment.

As illustrated in FIG. 5, the operation panel 10 includes a key microcomputer 10i, a kernel 10j and a monitor unit 10k. The key microcomputer 10i is implemented by the CPU 10a, the ROM 10b, the RAM 10c and the flash memory 10d. The kernel 10j and the monitoring unit 10k are circuitry implemented by the CPU 10a.

The controller 14 includes a power supply 14g, a Personal System (PS) microcomputer 14h, a Basic Input Output System (BIOS) 14i and an operation control unit 14j. The PS microcomputer 14h is circuitry implemented by the CPU 14a, ROM 14b, RAM 14c and HDD 14d. The BIOS 14i and the operation control unit 14j are circuitry implemented by the CPU 14a.

In the present embodiment, the operation panel 10 and the controller 14 are activated separately as described below. Specifically, the operation panel 10 and the BIOS 14*i* of the controller 14 are activated separately. There are two types of activation. Quick activation in which the controller 14 completes activation before the operation panel 10 and normal activation in which the controller 14 completes activation after the operation panel 10.

An example of relationship between each module illustrated in FIG. 5 is described below. In response to a pressing of the power switch 13, the power supply 14*g* supplies power to each unit. For example, in response to the pressing of the power switch 13, the power supply 14*g* transmits a signal (power ON signal) indicating that the power is on to the PS microcomputer 14*h*. In response to receiving the power ON signal, the power is supplied to the PS microcomputer 14*h*, and the PS microcomputer 14*h* becomes operable. Similarly, the other units become operable or start activation, in response to receiving the power ON signal.

The PS microcomputer 14*h*, which has become operable, transmits the input power ON signal to the BIOS 14*i* and the key microcomputer 10*i*. The BIOS 14*i* starts activation, in response to receiving the power ON signal. Further, when the power ON signal is input to the key microcomputer 10*i*, the key microcomputer 10*i* becomes operable.

After completing the activation of the BIOS 14*i*, the BIOS 14*i* sets an activation completion flag to a value "1" indicating that the activation of the BIOS 14*i* is completed. Then, the BIOS 14*i* notifies the PS microcomputer 14*h* of the activation completion flag in which the value "1" is set. The PS microcomputer 14*h* acquires the activation completion flag. The value "0" which indicates that activation of BIOS 14*i* is not completed is set to the activation completion flag before activation of the BIOS 14*i* is completed. The activation completion flag is stored in the RAM 14*c* or the HDD 14*d*, for example.

Further, the BIOS 14*i* issues an activation request to the operation control unit 14*j* for activating the operation control unit 14*j* of the controller 14 after the BIOS 14*i* is activated. In response to receiving the activation request, the operation control unit 14*j* is activated according to the activation request. After the activation of the operation control unit 14*j* is completed, the operation control unit 14*j* transmits a request for connecting (establishing) socket communication between the operation panel 10 and the controller 14 (socket communication request) to the monitoring unit 10*k* of the operation panel 10.

The key microcomputer 10*i*, which has become operable, transmits the input power ON signal to the kernel 10*j*.

The kernel 10*j* issues the activation request for activating the operation panel 10 to the monitoring unit 10*k*. Also, the kernel 10*j* acquires the activation completion flag from the PS microcomputer 14*h*. Then, the kernel 10*j* notifies the acquired activation completion flag to the monitoring unit 10*k*. The monitoring unit 10*k* acquires the activation completion flag from the PS microcomputer 14*h* through the kernel 10*j* as described above.

Figure 6:
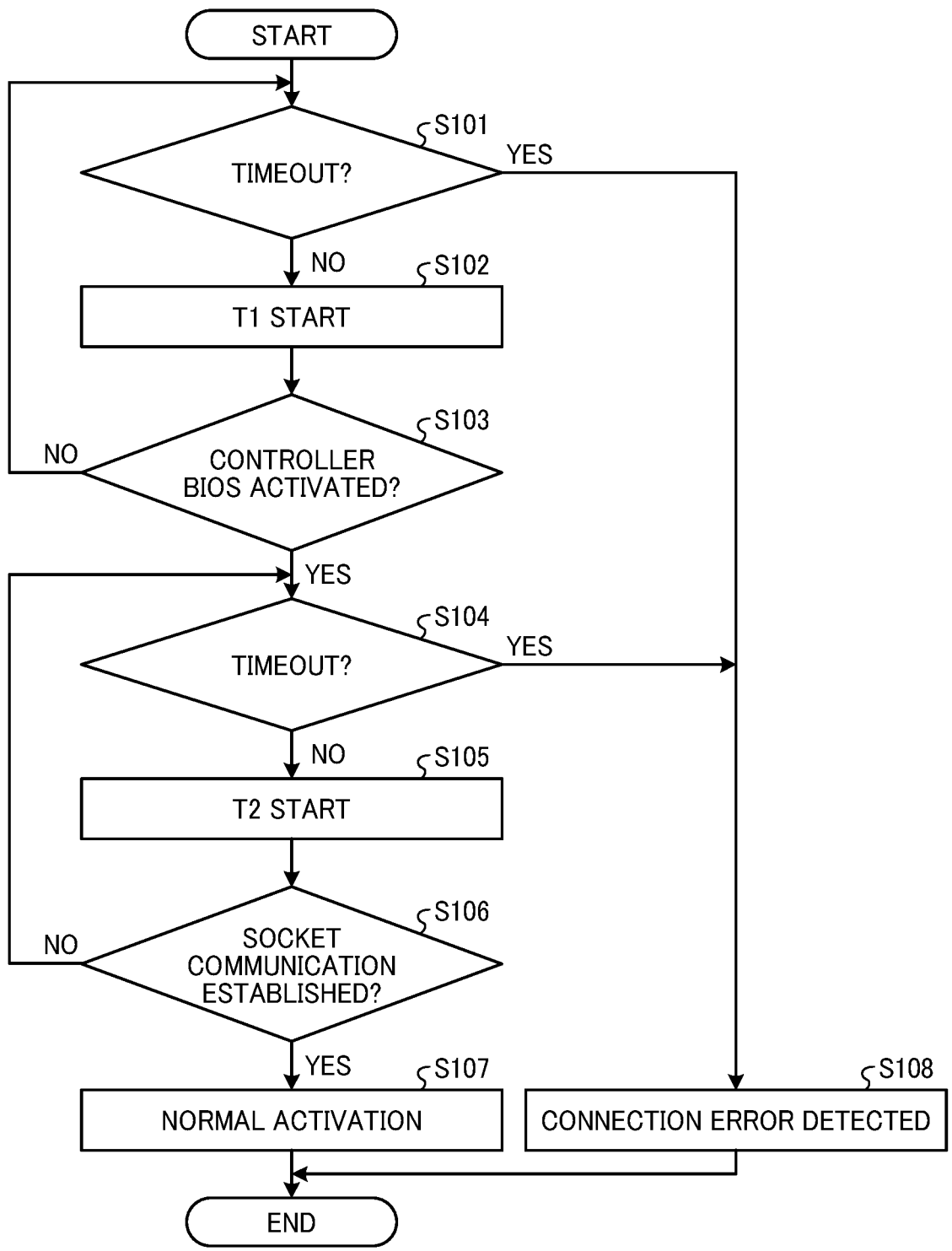
FIG. 6 is a flowchart illustrating an example of a connection error detection process according to the embodiments of the present disclosure.

With reference to FIG. 6, an example of a connection error detection process for detecting the connection error between the operation panel 10 and the controller 14 in the case the operation panel 10 and the controller 14 are activated separately is described. FIG. 6 is a flowchart illustrating an example of the connection error detection process according to the present embodiment. The connection error detection process is executed by the image forming apparatus 1, for example, in the case the power switch 13 is pressed and the operation panel 10 and the controller 14 are activated separately.

In steps S101 to S103 illustrated in FIG. 6, in response to the completion of the activation of the operation panel 10, the monitoring unit 10*k* determines whether the activation of the BIOS 14*i* of the controller 14 is completed within a predetermined period of time T1 after the activation of the operation panel 10 is completed. The predetermined period of time T1 is an example of a first predetermined period of time.

Specifically, in step S101, the monitoring unit 10*k* determines whether time (current time) at which the measurement was started in step S102, which is described below, has exceeded the time T1 (timeout). Note that in a first determination process of step S101, time measurement is not started in step S102. Accordingly, in the first step S101, the monitoring unit 10*k* determines that the time the measurement is started in step S102 has not exceeded the time T1 and has not timed out.

In the case of the timeout (step S101: Yes), the socket communication between the operation panel 10 and the controller 14 is not established because the controller 14 is not activated within the time T1. In step S108, the monitoring unit 10*k* detects the connection error which indicates that the socket communication between the operation panel 10 and the controller 14 is not established. Also, in step S108, the monitoring unit 10*k* causes the operation panel 10 to display a connection error message indicating that the socket communication between the operation panel 10 and the controller 14 is not established and a recovery method, and completes the connection error detection process. In the present embodiment, in the case the connection error is detected, the controller 14 does not automatically reactivate regardless of the timing at which the activation of the BIOS 14*i* is completed.

An example of a method for the image forming apparatus 1 to obtain the predetermined period of time T1 is described below. For example, the monitoring unit 10*k* causes the flash memory 10*d* to store a history of measured values of the time from the completion of activation of the operation panel 10 to the completion of activation of the BIOS 14*i* of the controller 14.

As a result, actual measurement values of a plurality of times from completion of activation of the operation panel 10 to completion of activation of the BIOS 14*i* of the controller 14 are stored in the flash memory 10*d* as history data. Then, the monitoring unit 10*k* obtains the measured values of the plurality of times stored in the flash memory 10*d*, and obtains the predetermined period of time T1 based on the obtained measured values of the plurality of times. For example, the monitoring unit 10*k* may obtain the longest measured value among the measured values of the plurality of times as the predetermined period of time T1, or obtain the average value of the measured values of the plurality of times as the predetermined period of time T1. The predetermined period of time T1 is, for example, 50 seconds, but the predetermined period of time T1 is not limited to this value.

In the case the timeout has not occurred (step S101: No), in step S102, the monitoring unit 10*k* starts measuring time using a software timer. Note that when the time measurement is started in step S102 for the first time, the process of step S102 for the second time and thereafter is omitted.

In step S103, the monitoring unit 10*k* determines whether the activation of the BIOS 14*i* of the controller 14 is completed. Specifically, the monitoring unit 10*k* acquires the activation completion flag from the PS microcomputer 14*h* through the kernel 10*j*, and determines whether the value set in the acquired activation completion flag is "1", in step S103. In the case the value set in the activation completion flag is "1", the monitoring unit 10*k* determines that the activation of the BIOS 14*i* is completed. On the other hand, in the case the value set in the activation completion flag is "0", the monitoring unit 10*k* determines that activation of the BIOS 14*i* is not completed.

In the case the activation of the BIOS 14*i* is not completed (step S103: No), the monitoring unit 10*k* returns to step S101 and performs processing of each step after step S101. On the other hand, in the case the activation of the BIOS 14*i* is completed (step S103: Yes), the monitoring unit 10*k* proceeds to step S104.

In steps S104 to S106, in the case the activation of the BIOS 14*i* is completed, the monitoring unit 10*k* determines whether the socket communication between the operation panel 10 and the controller 14 is established (connected) in the period from the completion of activation of the BIOS 14*i* until the predetermined period of time T2 elapses. The predetermined period of time T2 is an example of a second predetermined period of time.

Specifically, in step S104, the monitoring unit 10*k* determines whether the time (current time) at which the measurement started in step S105, which is described below, has exceeded the time T1 (timeout). Note that in a first determination process of step S104, time measurement is not started in step S105. Accordingly, in the first step S104, the monitoring unit 10*k* determines that the time the measurement is to be started in step S105 has not exceeded the time T1 (not timeout).

In the case the timeout occurred (step S104: Yes), the socket communication between the operation panel 10 and the controller 14 is not established. In step S108, the monitoring unit 10*k* detects the above-described connection error, causes the operation panel 10 to display the above-described connection error message and the recovery method, and terminates the connection error detection process.

An example of a method for the image forming apparatus 1 to obtain the predetermined period of time T2 is described below. For example, the monitoring unit 10*k* causes the flash memory 10*d* to store a history of measured values of the time from the completion of activation of the BIOS 14*i* to the connection of the socket communication between the operation panel 10 and the controller 14. That is, the flash memory 10*d* stores, as history data, measured values for a plurality of times from completion of activation of the BIOS 14*i* to the connection of the socket communication between the operation panel 10 and the controller 14. Then, the monitoring unit 10*k* obtains the measured values of the plurality of times stored in the flash memory 10*d*, and obtains the predetermined period of time T2 based on the obtained measured values of the plurality of times. For example, the monitoring unit 10*k* may obtain the longest measured value among the measured values for a plurality of times as the predetermined period of time T2, or obtain the average value of the measured values for the plurality of times as the predetermined period of time T2. The predetermined period of time T2 is, for example, 20 seconds, but the predetermined period of time T2 is not limited to this value.

In the case the timeout has not occurred (step S104: No), the monitoring unit 10*k* starts measuring time using a software timer, in step S105. Note that when the time measurement is started in step S105 for the first time, the process of step S105 for the second time and thereafter is omitted.

In step S106, the monitoring unit 10*k* determines whether the socket communication between the operation panel 10 and the controller 14 is established.

In the case the socket communication is not established (step S106: No), the monitoring unit 10*k* returns to step S104 and performs processing in each step after step S104. On the other hand, in the case the socket communication is established (step S106: Yes), the image forming apparatus 1 normally starts up in step S107, and terminates the connection error detection process.

Here, in a conventional technique, a specified slowest time is set as the timeout value in order for the operation panel to detect connection error in the controller, and in the case the socket communication between the operation panel and the controller is not established within the specified slowest time, the operation panel determines that there is a connection error with the controller. The slowest time is determined, for example, in consideration of two times, the time from the completion of activation of the operation panel to the completion of activation of the controller, and the time from the completion of activation of the controller to the start of the socket communication.

On the other hand, in the present embodiment, the monitoring unit 10*k* detects the connection error when the controller 14 is not activated within the predetermined period of time T1 after activation of the operation panel 10 is completed. The predetermined period of time T1 is the time based on the actual measurement of the time from the completion of activation of the operation panel 10 to the completion of activation of the BIOS 14*i* of the controller 14. The image forming apparatus 1 according to the present embodiment detects the connection error without waiting for unnecessary time as compared with the conventional technology. Accordingly, the image forming apparatus 1 of the present embodiment is able to reduce an increase in the time to detect a malfunction regarding the controller 14 by the operation panel 10.

Hereinafter, a case of normal activation in which the controller 14 completes activation after the activation of the operation panel 10 is described. Here, the BIOS 14*i* of the controller 14 completes activation in a time shorter than the predetermined period of time T1 after the activation of the operation panel 10 is completed, and a case where the above-described socket communication is not established during the predetermined period of time T2 has elapsed after the activation of the BIOS 14*i* is completed is described. In this case, the monitoring unit 10*k* detects the connection error when the time shorter than the predetermined period of time T1 plus the predetermined period of time T2 has passed since the completion of activation of the operation panel 10. Accordingly, the monitoring unit 10*k* detects the connection error in a shorter time compared to detecting the error at the time when the predetermined period of time T1 plus the predetermined period of time T2 has elapsed after the completion of activation of the operation panel 10. Therefore, from this point of view as well, the image forming apparatus 1 of the present embodiment is able to reduce an increase in the time to detect a malfunction regarding the controller 14 by the operation panel 10.

Hereinafter, a case of quick activation in which the controller 14 completes the activation before the activation of the operation panel 10 is described. In this case, each process of steps S101 to S103 illustrated in FIG. 6 is executed once without being repeated a plurality of times. In other words, each process of steps S101 to S103 from the second time onwards is skipped. As a result, the monitoring unit 10k detects the connection error without wasting time. Therefore, from this point of view as well, the image forming apparatus 1 of the present embodiment is able to reduce an increase in the time to detect a malfunction regarding the controller 14 by the operation panel 10. Note that, in the case of quick activation, the monitoring unit 10k may omit the processes in steps S101 to S103 in the connection error detection process, and perform the processes after step S104 as described below.

Figure 7:
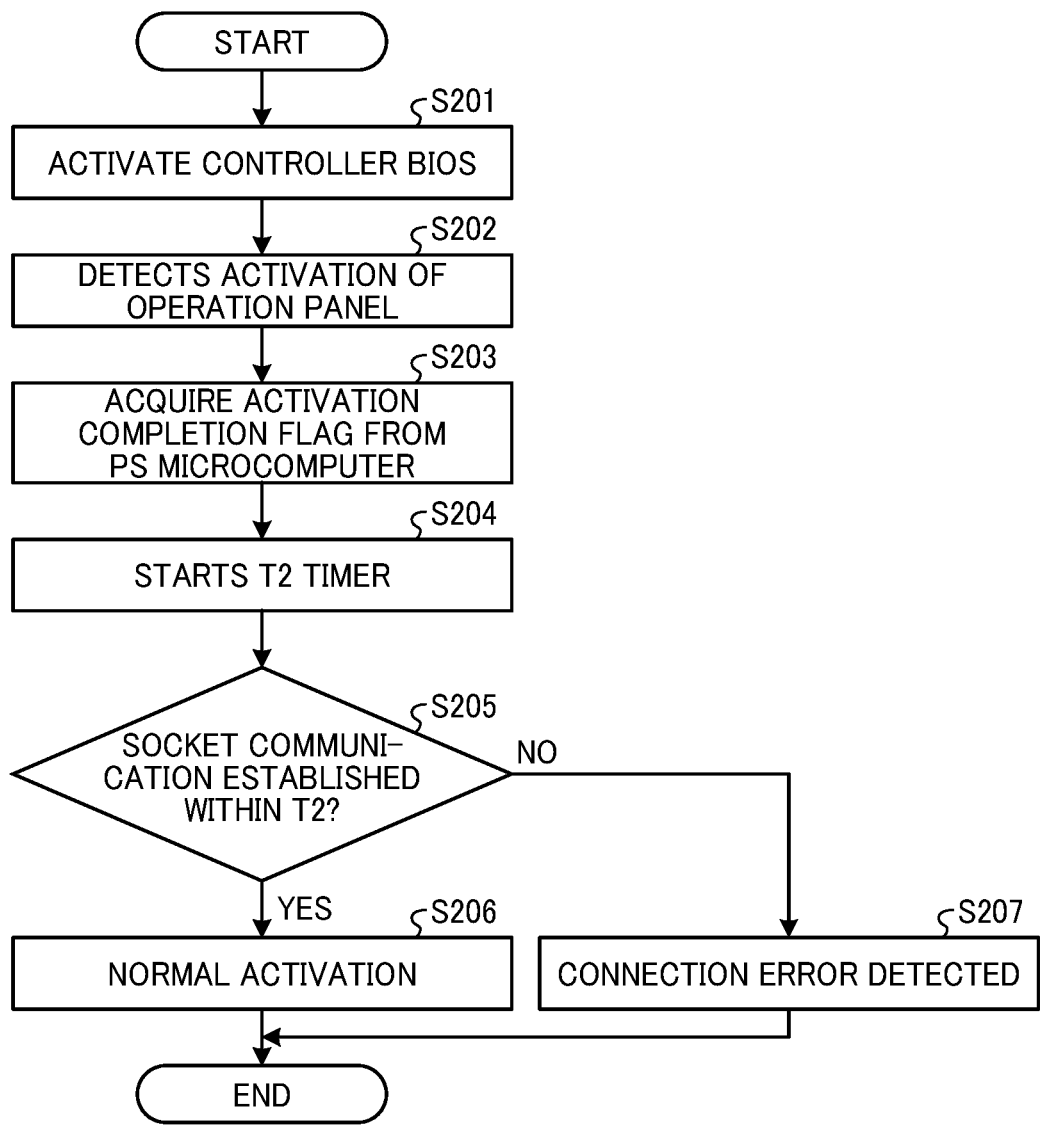
FIG. 7 is a flowchart illustrating an example of detailed connection error detection process in a case of quick activation according to the embodiments of the present disclosure.

With reference to FIG. 7, an example of detailed connection error detection process in the case of quick activation is described. FIG. 7 is a flowchart illustrating an example of detailed connection error detection process in the case of quick activation according to the present embodiment.

In step S201 of FIG. 7, the BIOS 14i is activated. In step S202, the monitoring unit 10k detects activation of the operation panel 10. In step S203, the monitoring unit 10k obtains the activation completion flag from the PS microcomputer 14h through the kernel 10j. Here, the value set in the obtained activation completion flag is "1". Accordingly, the monitoring unit 10k determines that the activation of the BIOS 14i is completed.

In step S204, the monitoring unit 10k starts measuring time using the software timer. In step S205, the monitoring unit 10k determines whether the socket communication between the operation panel 10 and the controller 14 is established during a time period from the activation of the BIOS 14i until the predetermined period of time T2 has passed.

In the case the socket communication is not established (step S205: No), in step S207, the monitoring unit 10k detects the above-described connection error, causes the operation panel 10 to display the above-described connection error message and the recovery method, and terminates the connection error detection process. On the other hand, in the case the socket communication is established (step S205: Yes), the image forming apparatus 1 is activated normally in step S206, and the connection error detection process terminates.

Figure 8:
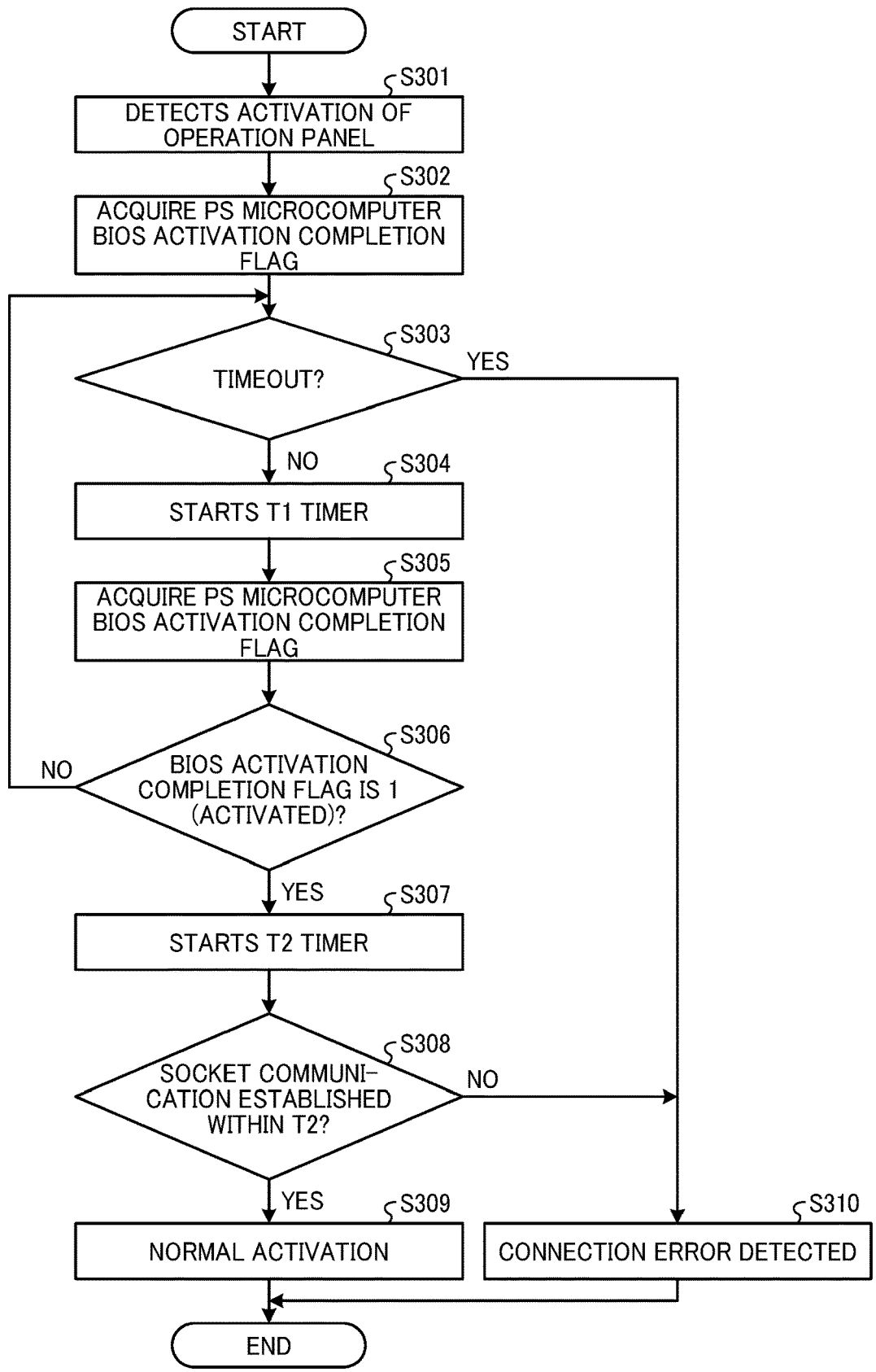
FIG. 8 is a flowchart illustrating an example of detailed connection error detection process in a case of general activation according to the embodiments of the present disclosure.

With reference to FIG. 8, the case of the normal activation in which the controller 14 completes activation after the operation panel 10 is described. In this case, steps S101 to S103 illustrated in FIG. 6 is repeatedly executed until the activation of the BIOS 14i of the controller 14 is completed.

FIG. 8 is a flowchart illustrating an example of the detailed connection error detection process in the case of normal activation according to the present embodiment.

As illustrated in FIG. 8, in step S301, the monitoring unit 10k detects activation of the operation panel 10. In step S302, the monitoring unit 10k acquires the activation completion flag from the PS microcomputer 14h through the kernel 10j. Here, the value set in the obtained activation completion flag is "0". Accordingly, the monitoring unit 10k determines that the activation of the BIOS 14i is not completed.

In step S303, the monitoring unit 10k determines whether the time (current time) at which the measurement started in step S304, which is described below, has exceeded the time T1 (timeout). Note that in a first determination process of step S303, time measurement is not started in step S304. Accordingly, in the first step S303, the monitoring unit 10k determines that the time the measurement is started in step S304 has not exceeded the time T1 (no timeout).

In the case of timeout (step S303: Yes), the monitoring unit 10k detects the connection error indicating that socket communication between the operation panel 10 and the controller 14 is not established in step S310. Also, in step S310, the monitoring unit 10k causes the operation panel 10 to display the connection error message described above and the recovery method, and terminates the detection process.

In the case the timeout has not occurred (step S303: No), the monitoring unit 10k starts measuring time using the software timer, in step S304. Note that when the time measurement is started in step S304 for the first time, the process of step S304 for the second time and thereafter is omitted.

In step S305, the monitoring unit 10k obtains the activation completion flag from the PS microcomputer 14h through the kernel 10j. Here, when the activation of the BIOS 14i is completed, the value set in the obtained activation completion flag is "1". On the other hand, when the activation of the BIOS 14i is not completed, the value set in the obtained activation completion flag is "0".

In step S306, the monitoring unit 10k determines whether the obtained value set in the activation completion flag is "1". In the case the value set in the activation completion flag is "1", the monitoring unit 10k determines that the activation of the BIOS 14i is completed. On the other hand, in the case the value set in the activation completion flag is "0", the monitoring unit 10k determines that activation of the BIOS 14i is not completed.

In the case the value set in the activation completion flag is "0" (step S306: No), the monitoring unit 10k returns to step S303 and performs processing in steps after step S303. On the other hand, in the case the value set in the activation completion flag is "1" (step S306: Yes), the monitoring unit 10k proceeds to step S307.

In step S307, the monitoring unit 10k starts measuring time using the software timer. In step S308, the monitoring unit 10k determines whether the socket communication between the operation panel 10 and the controller 14 is established during the time period from the activation of the BIOS 14i until the predetermined period of time T2 has passed.

In the case the socket communication is not established (step S308: No), in step S310, the monitoring unit 10k detects the above-described connection error, causes the operation panel 10 to display the above-described connection error message and the recovery method, and terminates the connection error detection process. On the other hand, in the case the socket communication is established (step S308: Yes), the image forming apparatus 1 is activated normally in step S309, and the connection error detection process terminates.

The embodiments of the present disclosure are described above. In the present embodiment, the image forming apparatus 1 includes the operation panel 10 and the controller 14 that activate separately and communicate with each other. In the case the controller 14 completes activation after the operation panel 10, the operation panel 10 determines whether activation of the controller 14 is completed in a time period from the completion of activation of the operation panel 10 to the elapse of a predetermined period of time T1 (first determination process). Then, the operation panel 10 determines whether the communication between the operation panel 10 and the controller 14 is established within the predetermined period of time T2 after the completion of activation of the controller 14 (second determination process). The operation panel 10 detects the connection error between the operation panel 10 and the controller 14 by performing the first determination process and the second determination process. On the other hand, in the case the controller 14 completes activation before the operation panel 10, the operation panel 10 performs the second determination process among the first determination process and the second determination process. Accordingly, the image forming apparatus 1 of the present embodiment is able to reduce an increase in the time to detect the malfunction regarding the controller 14 by the operation panel 10.

Further, in the present embodiment, in the first determination process, the operation panel 10 repeats determination of whether the activation of the controller 14 is completed, until the predetermined period of time T1 elapses after the activation of the operation panel 10 is completed. Based on a determination that the activation of the controller 14 is completed, the operation panel 10 performs the second determination process. In other words, the operation panel 10 performs the second determination process in response to a determination that the activation of the controller 14 is completed, without waiting for the predetermined period of time T1. Accordingly, the image forming apparatus 1 of the present embodiment is able to reduce an increase in the time to detect the malfunction in the controller 14 by the operation panel 10.

Further, in the present embodiment, the operation panel 10 determines the predetermined period of time T1 based on the measured value of the time from the completion of activation of the operation panel 10 to the completion of activation of the controller 14. Further, in the present embodiment, the operation panel 10 sets the predetermined period of time T2 based on the measured value of the time from the completion of activation of the controller 14 to the establishment of communication between the operation panel 10 and the controller 14. The predetermined period of time T1 and predetermined period of time T2 are based on actual measurements. Accordingly, the operation panel 10 is able to accurately determine the predetermined period of time T1 and predetermined period of time T2.

The program executed by the operation panel 10 in the above described embodiments may be recorded as a file of an installable format or an executable format on a non-transitory computer-readable recording medium such as a compact disc read-only memory (CR-ROM), a flexible disk (FD), a compact disc recordable (CD-R), or a digital versatile disc (DVD).

Further, the program executed by the operation panel 10 may be stored on a computer connected to a network such as the internet and provided by downloading the program through the network. Also, the program executed by the operation panel 10 of the above described embodiments may be provided or distributed through the network such as the internet.

Further, a program according to the above described embodiments may be provided as being preloaded in the ROM and the like.

Technique of the above described embodiments is also applicable to other information processing apparatuses in which separate CPUs are installed in the controller and the operation panel, and the controller and the operation panel are activated separately. For example, the technique of the above described embodiments can be applied to other information processing apparatuses such as washing machines.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus comprising an operation panel and a controller that activate separately and communicably connected to each other, the operation panel including circuitry configured to:
   in a case the controller completes an activation after the operation panel completes an activation, detect a connection error between the operation panel and the controller by performing a first determination process of determining whether activation of the controller is completed within a first predetermined period of time after activation of the operation panel is completed, and by performing a second determination process of determining whether communication between the operation panel and the controller is established within a second predetermined period of time after completion of the activation of the controller; and
   in a case the controller completes the activation before the operation panel completes the activation, detect the connection error between the operation panel and the controller by performing the second determination process.

2. The information processing apparatus of claim 1, wherein
   the circuitry is further configured to:
   in the first determination process, perform a process of determining whether the activation of the controller is completed repeatedly, until the first predetermined period of time elapses after the activation of the operation panel is completed; and
   perform the second determination process based on a determination that the activation of the controller is completed.

3. The information processing apparatus of claim 1, wherein
   the circuitry is further configured to determine the first predetermined period of time based on a measured value of the time from completion of the activation of the operation panel to completion of the activation of the controller.

4. The information processing apparatus of claim 1, wherein
   the circuitry is further configured to determine the second predetermined period of time based on a measured value of the time from completion of the activation of the controller to an establishment of communication between the operation panel and the controller.

5. The information processing apparatus of claim 1, further comprising a printer that forms an image on a sheet material.

6. A method executed by an operation panel communicably connected with a controller of an image forming apparatus, the operation panel and the image forming apparatus being configured to activate separately, the method including:

- in a case the controller completes an activation after the operation panel completes an activation, detecting a connection error between the operation panel and the controller by performing a first determination process of determining whether activation of the controller is completed within a first predetermined period of time after activation of the operation panel is completed and by performing a second determination process of determining whether communication between the operation panel and the controller is established within a second predetermined period of time after completion of the activation of the controller; and
- in a case the controller completes the activation before the operation panel completes the activation, detecting the connection error between the operation panel and the controller by performing the second determination process.

7. A non-transitory recording medium which, when executed by one or more processors on an operation panel communicably connected with a controller of an image forming apparatus, the operation panel and the controller being configured to activate separately, cause the processors to perform a method including:

- in a case the controller completes an activation after the operation panel completes an activation, detecting a connection error between the operation panel and the controller by performing a first determination process of determining whether activation of the controller is completed within a first predetermined period of time after activation of the operation panel is completed and by performing a second determination process of determining whether communication between the operation panel and the controller is established within a second predetermined period of time after completion of the activation of the controller; and
- in a case the controller completes the activation before the operation panel completes the activation, detecting the connection error between the operation panel and the controller by performing the second determination process.

* * * * *